United States Patent
Diochon et al.

(10) Patent No.: US 8,042,342 B2
(45) Date of Patent: Oct. 25, 2011

(54) ENGINE ASSEMBLY FOR AIRCRAFT COMPRISING AN ENGINE AS WELL AS A DEVICE FOR LOCKING SAID ENGINE

(75) Inventors: Lionel Diochon, Toulouse (FR); Raffaella Mastroberti, Blagnac (FR); Isabelle Petrissans, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 853 days.

(21) Appl. No.: 12/064,924

(22) PCT Filed: Sep. 22, 2006

(86) PCT No.: PCT/EP2006/066635
§ 371 (c)(1),
(2), (4) Date: Feb. 26, 2008

(87) PCT Pub. No.: WO2007/033994
PCT Pub. Date: Mar. 29, 2007

(65) Prior Publication Data
US 2008/0216483 A1    Sep. 11, 2008

(30) Foreign Application Priority Data
Sep. 26, 2005   (FR) ...................................... 05 52869

(51) Int. Cl.
*F02K 3/04* (2006.01)
(52) U.S. Cl. ........................................... 60/797; 244/54
(58) Field of Classification Search ................. 60/796, 60/797; 244/54
See application file for complete search history.

(56) References Cited

U.S. PATENT DOCUMENTS

| | | | | |
|---|---|---|---|---|
| 4,013,246 A * | 3/1977 | Nightingale | ..................... | 244/54 |
| 4,603,821 A * | 8/1986 | White | .............. | 60/797 |
| 5,181,675 A * | 1/1993 | Lardellier et al. | ............. | 244/54 |
| 5,409,184 A * | 4/1995 | Udall et al. | .................. | 60/797 |
| 5,524,847 A * | 6/1996 | Brodell et al. | ............... | 60/797 |
| 5,725,181 A * | 3/1998 | Hey | ............... | 60/797 |
| 6,398,161 B1 | 6/2002 | Jule et al. | | |
| 6,935,591 B2 * | 8/2005 | Udall | ............ | 244/54 |
| 2005/0194493 A1* | 9/2005 | Marche | .......... | 244/54 |

FOREIGN PATENT DOCUMENTS

| | | |
|---|---|---|
| EP | 0 805 108 | 11/1997 |
| GB | 2 010 969 | 7/1979 |

OTHER PUBLICATIONS

U.S. Appl. No. 12/088,450, filed Mar. 28, 2008, Diochon et al.

* cited by examiner

*Primary Examiner* — Ted Kim
(74) *Attorney, Agent, or Firm* — Oblon, Spivak, McClelland, Maier & Neustadt, L.L.P.

(57) ABSTRACT

An aircraft engine assembly including an engine and a mount device for the engine. The mount device can be positioned between a wing of the aircraft and the engine, and includes a rigid structure and a mechanism to mount the engine on the rigid structure, the mounting mechanism including a first attachment and a second attachment. The first attachment includes two side semi-attachments each fixed to a fan case of the engine, and the second attachment is fixed onto a forward part of a central case of the engine.

13 Claims, 12 Drawing Sheets

ENGINE ASSEMBLY FOR AIRCRAFT COMPRISING AN ENGINE AS WELL AS A DEVICE FOR LOCKING SAID ENGINE

TECHNICAL AREA

The present invention generally pertains to the area of pylons for the securing of aircraft engines, intended to be positioned between an aircraft wing and an engine, and more particularly pertains to an engine assembly comprising said pylon device.

The invention can be used on any type of aircraft equipped with turbojet engines or turboprop engines, or further with any type of engine.

This type of securing pylon also called <<EMS>> for Engine Mounting Structure, can be used to suspend a turbojet engine below an aircraft wing or to mount this turbojet engine above this same wing.

STATE OF THE PRIOR ART

An aircraft engine mounting device is designed to form the connecting interface between an engine and the aircraft wing. It permits the loads generated by its associated engine to be transmitted to the airframe, and also provides a path for fuel lines, electricity, hydraulics and air between the engine and the aircraft.

To ensure the transmission of loads, the engine mount comprises a rigid structure e.g. of box type, i.e. formed by the assembly of upper and lower spars joined together by transverse ribs.

Also, the engine mount is provided with mounting means positioned between the engine and the rigid structure of the engine mount, these means globally comprising two attachments, generally a forward attachment and an aft attachment.

Additionally, some mounting means comprise a thrust mount device transferring thrust loads generated by the turbojet engine. In the prior art, this device is typically in the form of two side links connected firstly to a forward portion of the central engine case or to an aft portion of the fan case, and secondly to the rigid structure of the mount assembly.

Similarly, the engine mount also comprises a mounting system inter-positioned between the engine mount and the aircraft wing, this system generally consisting of two or three attachments.

Finally, the engine mount is provided with a secondary structure which separates and supports the different systems whilst carrying aerodynamic cowling.

In a manner known to those skilled in the art, the thrust loads generated by the engine usually cause longitudinal bending of the engine to a greater or lesser extent, namely bending resulting from torque derived from thrust loads and exerted along a transverse axis of the aircraft. In this respect, it is also noted that under aircraft cruise conditions the thrust loads are the sole cause of longitudinal bending of the engine.

When said longitudinal bending occurs, in particular during cruise phases of the aircraft, there are two possible cases. In a first case, in which no particular precaution has been taken regarding the observed bending, strong friction is inevitably encountered firstly between the rotating fan blades and the fan case, and secondly between the rotating compressor and turbine blades and the central engine case. The main consequence of such friction is early wear of the engine, which is evidently detrimental to its lifetime and to its level of performance. In the second case, in which operating clearances have been adapted so that there is practically never any contact caused by longitudinal bending, the yield of the engine comes to be strongly reduced.

In the light of the foregoing, it obviously appears that it is necessary to provide for mounting means which best limit longitudinal bending of the engine due to thrust loads, so as to minimize restricting friction as much as possible without having to oversize the above-mentioned operating clearances.

It has been observed, however, that the mounting means in the prior art do not allow fully satisfactory limitation of engine longitudinal bending which results from transverse axis torque related to thrust loads, in particular during cruise phases of the aircraft.

SUMMARY OF THE INVENTION

The purpose of the invention is therefore to propose an aircraft engine assembly which, at least in part, overcomes the above-mentioned drawbacks connected with prior art embodiments.

For this purpose, the subject-matter of the invention is an aircraft engine assembly comprising an engine and an engine mount, the engine mount being intended to be inter-positioned between an aircraft wing and this engine, and comprising a rigid structure and means to mount the engine on the rigid structure, the mounting means consisting of a first attachment and a second attachment. According to the invention, the first attachment consists of two side semi-attachments each fixed to a fan case of the engine, and the second attachment is fixed to forward part of a central case for this same engine.

In other words, in the engine assembly of the invention, all the intended engine attachments are fixed either to the fan case of the engine, or to a forward part of the central engine case. Therefore, in this configuration specific to the invention in which the transfer of loads generated by the engine can be ensured solely on the forward part of the central case by means of the second engine attachment, it is to be appreciated that the aft central part of the central case of this engine is no longer joined to the engine mount by one or more aft engine attachments, as is the case in prior art embodiments. Similarly, the invention does not therefore provide for any engine attachment at the exhaust case of the engine, which means that it is practically the entire part of the engine located at the aft of the fan case which is advantageously devoid of any link with the mounting means.

Evidently, it is to be understood that the mechanical link, via which the loads from the engine are able to transit between the engine and the rigid structure, solely consists of the above-mentioned mounting means, themselves solely consisting of said two side-attachments of the first attachment and said second attachment. On this account, the entire part of the engine located aft relative to said second engine attachment fixed to a forward part of the central engine case, is devoid of any engine attachment for securing onto the rigid structure.

As a result, this special arrangement of the engine attachments leads to considerably reduced bending encountered at the central case, whether this bending is due to thrust loads generated by the engine, or to wind gusts which may be encountered during the various flight phases of the aircraft.

Therefore, the above-mentioned reduction in bending generates a significant decrease in friction between the rotating compressor and turbine blades and the central engine case, and hence largely limits yield losses due to early wear of these blades.

By way of indication, it is noted that by making provision for one engine attachment on the fan case and one engine attachment on the forward part of the central engine case, this fact offers the possibility to space them well away from each other. The advantage of such spacing is the ability to simplify the design of these engine attachments, owing to the fact that the loads they are to transfer, associated with a moment along a given axis, are naturally weakened compared with those found in conventional prior art solutions, in which the engine attachments located solely on the central case are not able to be spaced so far apart.

Finally, it is indicated that the engine attachments and the engine mount can advantageously be positioned away from the hot part of the engine, which involves a significant reduction in the thermal effects which may be applied to these elements.

Preferably, the second engine attachment is designed so as to transfer the loads exerted along a longitudinal direction of the engine, and the two semi-attachments of the first engine attachment are each designed so as to transfer loads exerted along the longitudinal direction of the engine and along a vertical direction of the engine.

In addition, it may alternatively be provided that either one of the two engine attachments is also designed so that it transfers loads exerted along a transverse direction of the engine.

Preferably, the second engine attachment is fixed to a portion of the front part of the central case which carries the fixed blades connecting this central case to said fan case. In this case, it is effectively the entire part of the engine located to the aft of the fan case which is advantageously free of any link with the mounting means, and which is therefore able to move freely without undergoing any longitudinal bending.

Nevertheless, it is recalled that the second engine attachment could be positioned further aft on the central engine case, but remaining within a forward part thereof, i.e. in a part forward of the high pressure compressor.

Preferably, the first attachment comprises an engine part fixed to the engine and an engine mount part fixed to the rigid structure, the engine and engine mount parts being fixed to each other and respectively having two contact surfaces bearing against each other, these two contact surfaces being oriented along a plane defined by the transverse and vertical directions of the engine.

Provision may then be made for the second attachment to comprise an engine part fixed to the engine and an engine mount part fixed to the rigid structure, the engine and engine mount parts being fixed to each other and respectively having two contact surfaces bearing against each other, these two contact surfaces being oriented along a plane defined by the longitudinal and vertical directions of the engine.

However, one preferred solution consists of providing the second attachment with an engine part fixed to the engine and an engine mount part fixed to the rigid structure, the engine and engine mount parts being fixed to each other and respectively having two contact surfaces bearing against each other, these two contact surfaces being oriented however along a plane defined by the transverse and vertical directions of the engine.

In said case, the two engine attachments are then advantageously designed so as to allow axial positioning of the engine on the rigid structure, the relative axial movement made during mounting then being halted by abutments between the different contact surfaces arranged both vertically and transversally relative to the engine.

Another solution consists of providing for a second attachment comprising two side links to transfer thrust loads, these links having an aft end joined to the rigid structure. Therefore, by designing the second engine attachment in the form of a conventional thrust mount device, the design of the forward part of the rigid structure can then be simplified, insofar as it only carries the first attachment. In this configuration, the aft attachment is joined for example to a lower central part of the rigid structure by means of an evener bar carrying the aft ends of the thrust links, as is usually found in prior art embodiments.

Finally, it is indicated that advantageously the mounting system is an isostatic system, which largely facilitates its design.

Other advantages and characteristics of the invention will become apparent from the detailed non-limiting description given below.

BRIEF DESCRIPTION OF THE DRAWINGS

This description is made with reference to the appended drawings, amongst which.

DETAILED DESCRIPTION OF PREFERRED EMBODIMENTS

In the figures showing different preferred embodiments of the present invention, those elements carrying the same references correspond to identical or similar elements.

Figure 1:
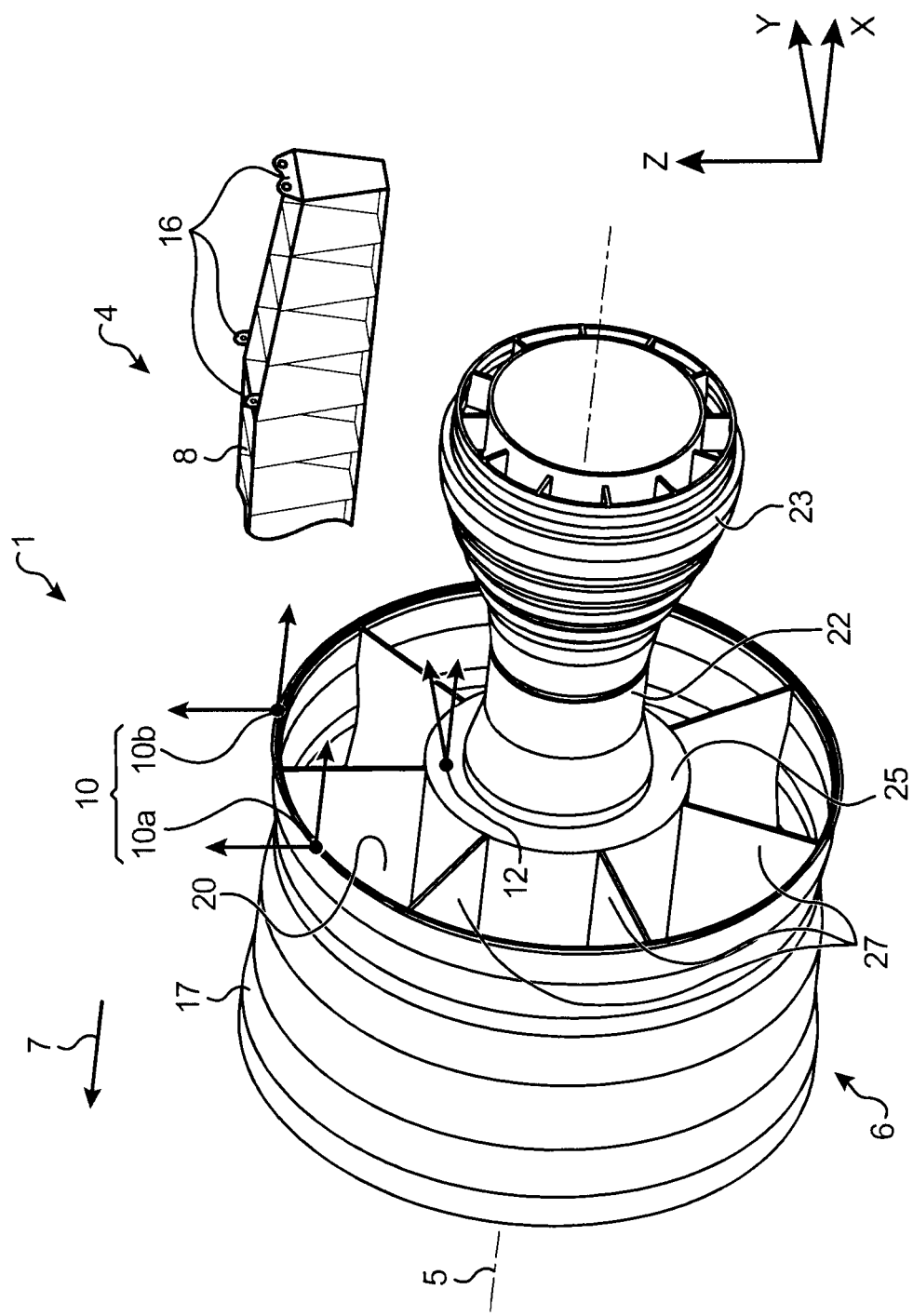
FIG. 1 is a partial, schematic view, in perspective of an aircraft engine assembly according to a first preferred embodiment of the present invention.

With reference first to FIG. 1, an engine assembly 1 can be seen intended to be suspended below a wing (not shown) of this aircraft, this assembly 1 being in the form of a first preferred embodiment of the present invention comprising a mount device 4 and an engine 6 such as a turbojet engine mounted below this device 4.

Globally, the mount device 4 comprises a rigid structure 8 carrying means to mount the engine 6, these mounting means consisting of two engine attachments 10, 12.

By way of indication, it is noted that assembly 1 is intended to be surrounded by a nacelle (not shown), and the mount device 4 comprises another series of attachments 16 used to suspend this assembly 1 below the aircraft wing.

In the remainder of the description, by convention, X is used to designate the longitudinal direction of the mount device 4 which is also comparable with the longitudinal direction of the turbojet engine 6, this direction X being parallel to a longitudinal centreline 5 of this turbojet engine 6. Also, Y designates the direction oriented transversally relative to the mount device 4 and is also comparable with the transverse direction of the turbojet engine 6, and Z designates the vertical direction or height, these three directions lying orthogonal to one another.

In addition, the terms <<forward>> and <<aft>> are to be considered with respect to the direction of travel of the aircraft subsequent to the thrust exerted by the turbojet engine 6, this direction being schematically illustrated by arrow 7.

In FIG. 1, the two engine attachments 10, 12 can be seen, and the series of attachments 16 and the rigid structure 8 of the mount device 4. The other constituent elements of this device 4, not shown, such as the secondary structure ensuring the separation and support of the different systems whilst carrying aerodynamic cowling, are conventional elements identical or similar to those found in the prior art and known to persons skilled in the art. Therefore no detailed description will be given thereof.

Additionally, it is indicated that the turbojet engine 6, in its forward part, has a fan case 18 of large size delimiting an annular fan duct 20, and towards the aft comprises a central case 22 of smaller size enclosing the core of this turbojet engine. Finally, the turbojet engine 6, towards the aft, ends in an exhaust case 23 of larger size than the central case 22. Evidently, cases 18, 22 et 23 are secured to one another. In this respect, the central case 22 comprises a portion 25 located forwardly and of larger diameter, this portion 25 carrying fixed blades 27 joining this same central case 22 to the fan case 18.

As can be seen FIG. 1, the engine attachments 10, 12 of the mount device 4 are two in number and are respectively called the first engine attachment and the second engine attachment, or upper attachment and lower attachment on account of their relative arrangement which is explained further on.

The first engine attachment 10 is inter-positioned between a forward end of the rigid structure 8 (not shown for reasons of clarity) and an upper annular part of the fan case 18.

More precisely, the first engine attachment 10 consists of two side semi-attachments 10a, each of these two semi-attachments 10a being designed so that they can transfer the loads exerted along direction X and along direction Z, as is schematically shown FIG. 1. Evidently, these two semi-attachments 10a are arranged symmetrically relative to a vertical plane (not shown) passing through the longitudinal centreline 5 of the engine 6.

More generally, it is specified that the above-mentioned vertical plane forms a plane of symmetry for the entire mount device 4 equipped with its mounting means.

Also, the second attachment 12 is positioned between the forward end of the rigid structure 8, and portion 25 of the central case 22 i.e. at a forward end of this central case 22.

This second attachment 12 which is therefore positioned below the first attachment 10 is designed so that it is able to transfer loads exerted along direction X, and loads exerted along direction Y.

With said isostatic arrangement, as can be seen schematically FIG. 1, the loads exerted along the longitudinal direction X are transferred jointly by the first and second attachments 10, 12, the loads exerted along the transverse direction Y are transferred solely by the second attachment 12, and the loads exerted along the vertical direction Z are transferred jointly by the two semi-attachments 10a of the first attachment 10.

Also, the transfer of the moment exerted along direction X is ensured solely by the two semi-attachments 10a of attachment 10, whilst transfer of the moments exerted along direction Y is ensured jointly by these two engine attachments 10, 12. In addition, the transfer of the moment exerted along direction Z is also ensured solely by the two semi-attachments 10a of the first attachment 10.

Figure 2:
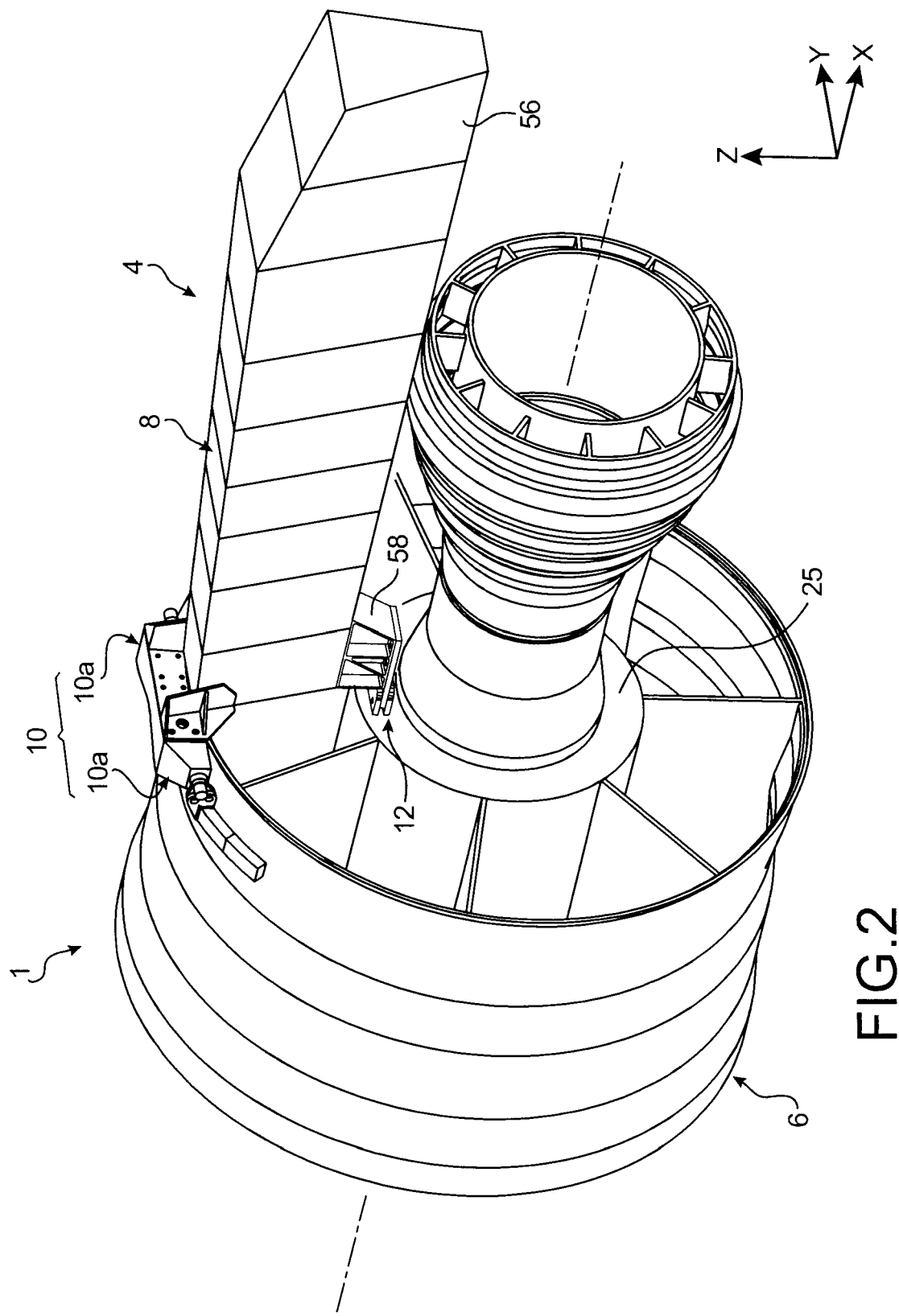
FIG. 2 is a perspective view of an aircraft engine assembly in the form of a first alternative to implement the first preferred embodiment of the present invention.

FIG. 2 shows an engine assembly 1 in the form of a first alternative to implement the first preferred embodiment shown FIG. 1.

In this first alternative, the first attachment 10 which incorporates the two semi-attachments 10a has a vertical interface i.e. it comprises two parts secured respectively to the engine 6 and the rigid structure 8 and which are in contact along a plane YZ, as will be explained in more detail with reference to FIG. 3. On the other hand, the second attachment 12 has a horizontal interface i.e. it comprises two parts respectively secured to the engine 6 and to the rigid structure 8 and which are in contact along a plane XY, as will be explained in more detail with reference to FIG. 4.

Figure 3:
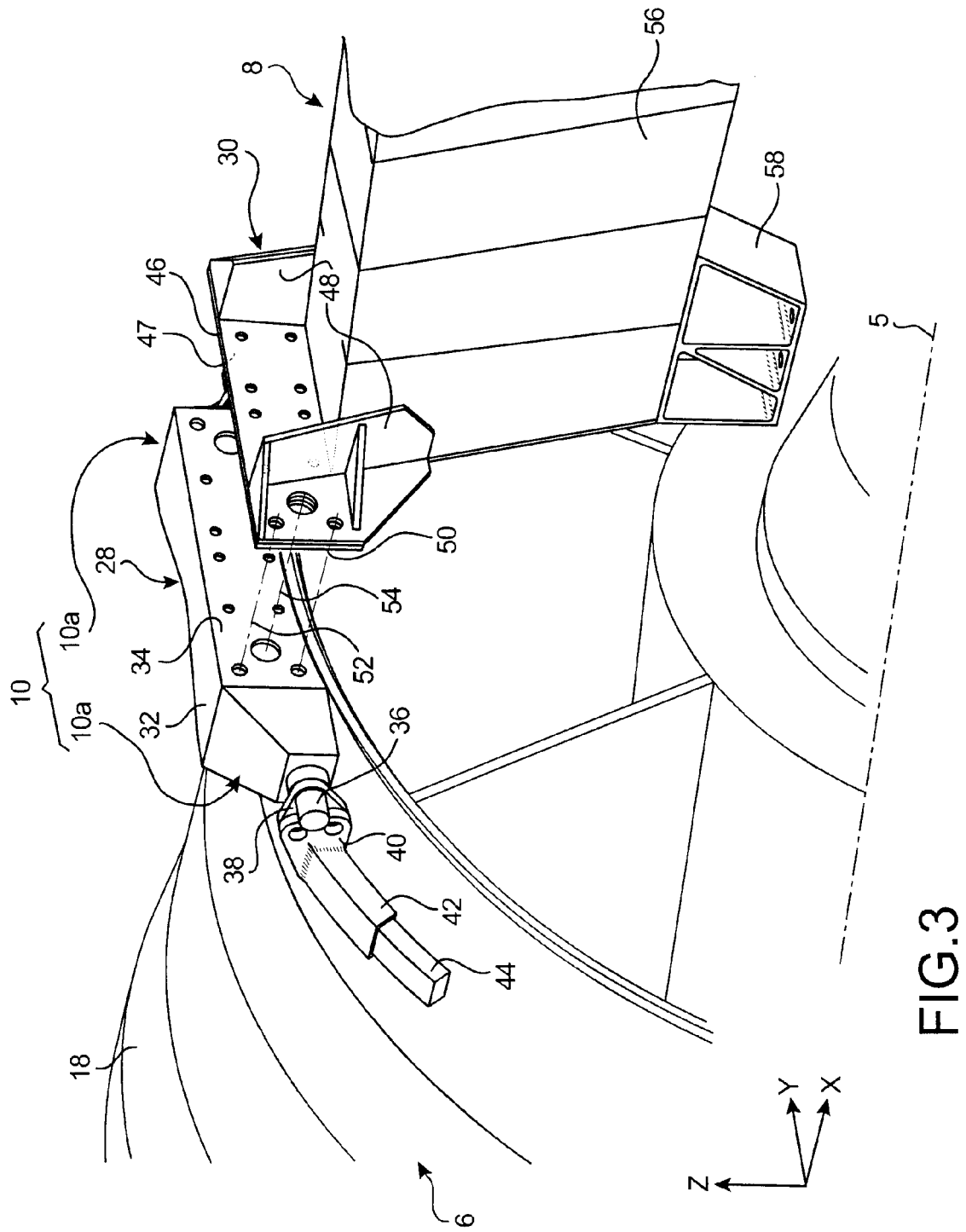
FIG. 3 is an exploded, perspective view of the first attachment shown on the engine assembly in FIG. 2.

Referring therefore to FIG. 3 which shows the first attachment 10, or upper attachment, before final mounting between the engine 6 and the rigid structure 8, it can be seen that this attachment 10 comprises an engine part 28 fixed to the engine 6 and an engine mount part 30 fixed to the rigid structure 8, each of these parts 28, 30 offering the vertical plane passing through the longitudinal centreline 5 as plane of symmetry, to define the two semi-attachments 10a.

The engine part 28 comprises a central bracket 32 oriented transversally and fixed to an upper end part of the fan case 18, this central bracket 32 integrating a contact surface 34 oriented along a plane YZ and towards the aft.

In addition, either side of this central bracket 32, provision is made for a pin 36 oriented along direction Y (only one being visible in FIG. 3 since it is an exploded, perspective view), each pin 36 forming an integral part of its associated semi-attachment 10a and cooperating with a side bracket 38 that is preferably triangular.

This side bracket 38 positioned along a plane XZ therefore has one apex pivoted on the above-mentioned pin 36, whilst its two other apexes are fixed by a pin onto a secondary side bracket 40 also oriented along a plane XZ, and made in a single piece with a frame 42 following the circumferential contour of the fan case 18. This frame 42 has an L-shaped section for example and is fixedly mounted on another frame 44 secured to the fan case 18, also having an L-shaped section to ensure biplanar contact between these two elements 42, 44.

As for the engine mount part 30, this is equipped with a central plate 46 integrating a contact surface 47 oriented along a plane YZ and in forward direction. This central plate 46 rests on two side supports 48 arranged either side of the forward part of the rigid structure 8.

As is schematically illustrated by the dotted lines 50, 52, 54 in FIG. 3, the engine and engine mount parts 28, 30 are intended to be fixed to each other e.g. via bolts and a pin (not shown) oriented along direction X. For this purpose, the contact surfaces 34 and 47 are previously brought to bear against one another, then the bolts and pin of each semi-attachment 10a are positioned so that they successively pass through the central bracket 32, the central plate 46, and the side support 48, these latter elements therefore having holes provided for this purpose.

It is noted that if only the left semi-attachment 10a is fully visible FIG. 3, the one on the right is of identical design. Additionally, it is to be appreciated that the central bracket 32 and the central plate 46 are elements that are considered to be common to the two semi-attachments 10a of the upper attachment 10.

To carry this upper attachment 10, the rigid structure 8 comprises a main box 56 of conventional type i.e. extending from aft to forwards substantially along direction X, and formed by the assembly of upper and lower spars joined together via transverse ribs. It is therefore at a forward end part of this box 56 that the engine mount part 30 of attachment 10 is secured.

Also, the rigid structure 8 comprises a part projecting downwardly 58, this part 58 being attached below the forward end of the box 56.

The projecting part 58 is essentially provided to ensure the mounting of the second attachment 12, as will be explained in more detail with reference to FIG. 4.

Figure 4:
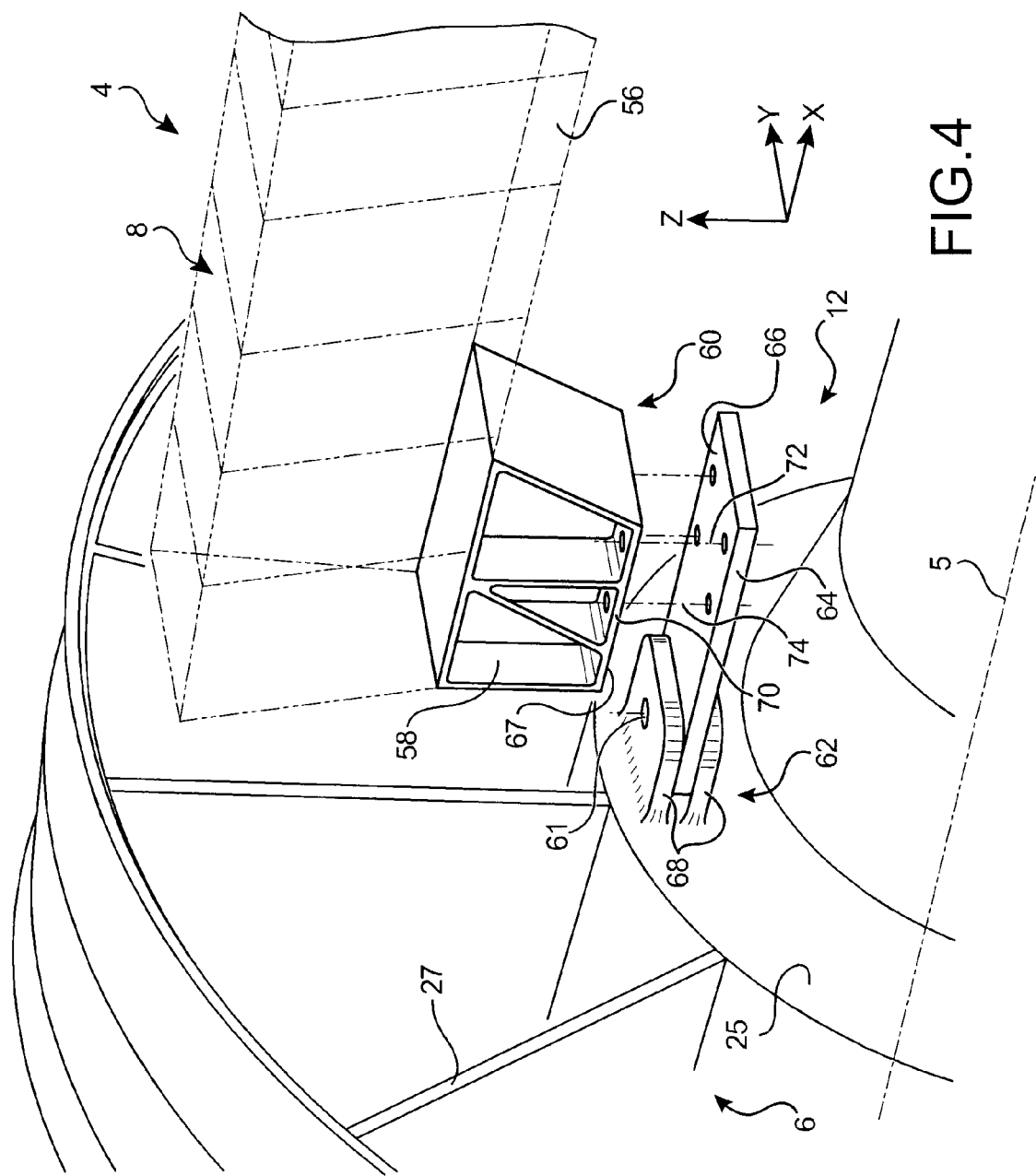
FIG. 4 is an exploded, perspective view of the second attachment shown on the engine assembly in FIG. 2.

With reference therefore to this FIG. 4 showing the second attachment 12, or lower attachment, before final mounting between the engine 6 and the rigid structure 8, it can be seen that this attachment 12 comprises an engine part 62 fixed to the engine 6, and more precisely onto portion 25 of the forward part of the central case, and an engine mount part 60 fixed to the rigid structure 8, and more precisely to the projecting part 58, each of these parts 60, 62 offering the vertical plane passing through the longitudinal centreline 5 as plane of symmetry.

The engine part 62 comprises a central plate 64 oriented longitudinally and horizontally, and integrates a contact surface 66 oriented along a plane XY, in upward direction. The engine part 62 also comprises two support brackets 68 secured to an upper part of portion 25, and between which a forward end of the central plate 64 is inserted. For this purpose, the two support brackets 68 are also arranged along planes XY, the bracket in the lower position optionally being equipped with longitudinal reinforcement ribs (not shown). A pin 61 oriented substantially vertically sets up a junction between the two support brackets 68 and the central plate 64.

As for the engine mount part 60, this is essentially equipped with a central plate 70 integrating a contact surface 67 oriented along a plane XY and downwardly, this central plate 70 then forming a lower end of the projecting portion 58 of the rigid structure 8.

As is schematically illustrated by the dotted lines 72, 74 in FIG. 4, the engine and engine mount parts 62, 60 are intended to be fixed to each other e.g. via bolts (not shown) oriented along direction Z. For this purpose, the contact surfaces 66 and 67 are previously brought go bear against each other, then the bolts are positioned so as successively to pass through the central plates 70 and 64, these plates therefore being provided with holes for this purpose.

Figure 5:
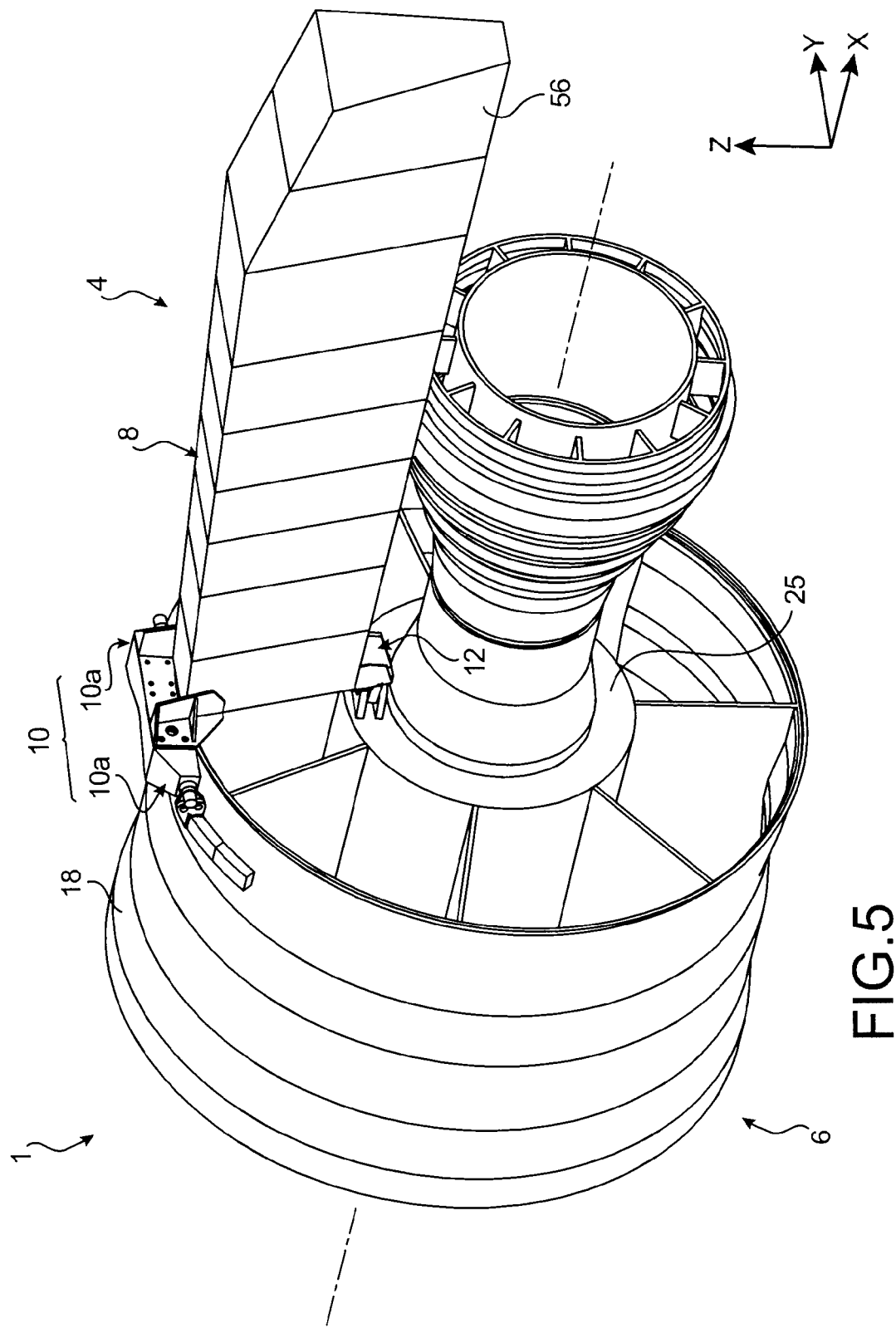
FIG. 5 is a perspective view of an aircraft engine assembly in the form of a second alternative to implement the first preferred embodiment of the present invention.

FIG. 5 shows an engine assembly 1 in the form of a second alternative to implement the first preferred embodiment shown FIG. 1.

In this second alternative, the first attachment 10 which incorporates the two semi-attachments 10a is of identical design to that of attachment 10 shown FIGS. 2 and 3. Therefore it will not be further described.

On the other hand, the second attachment 12 of this second alternative has the specificity that it integrates a vertical interface i.e. it comprises two parts secured to the engine 6 and to the rigid structure 8 respectively, and which are in contact along a plane YZ, as will now be described in detail with reference to FIG. 6.

Figure 6:
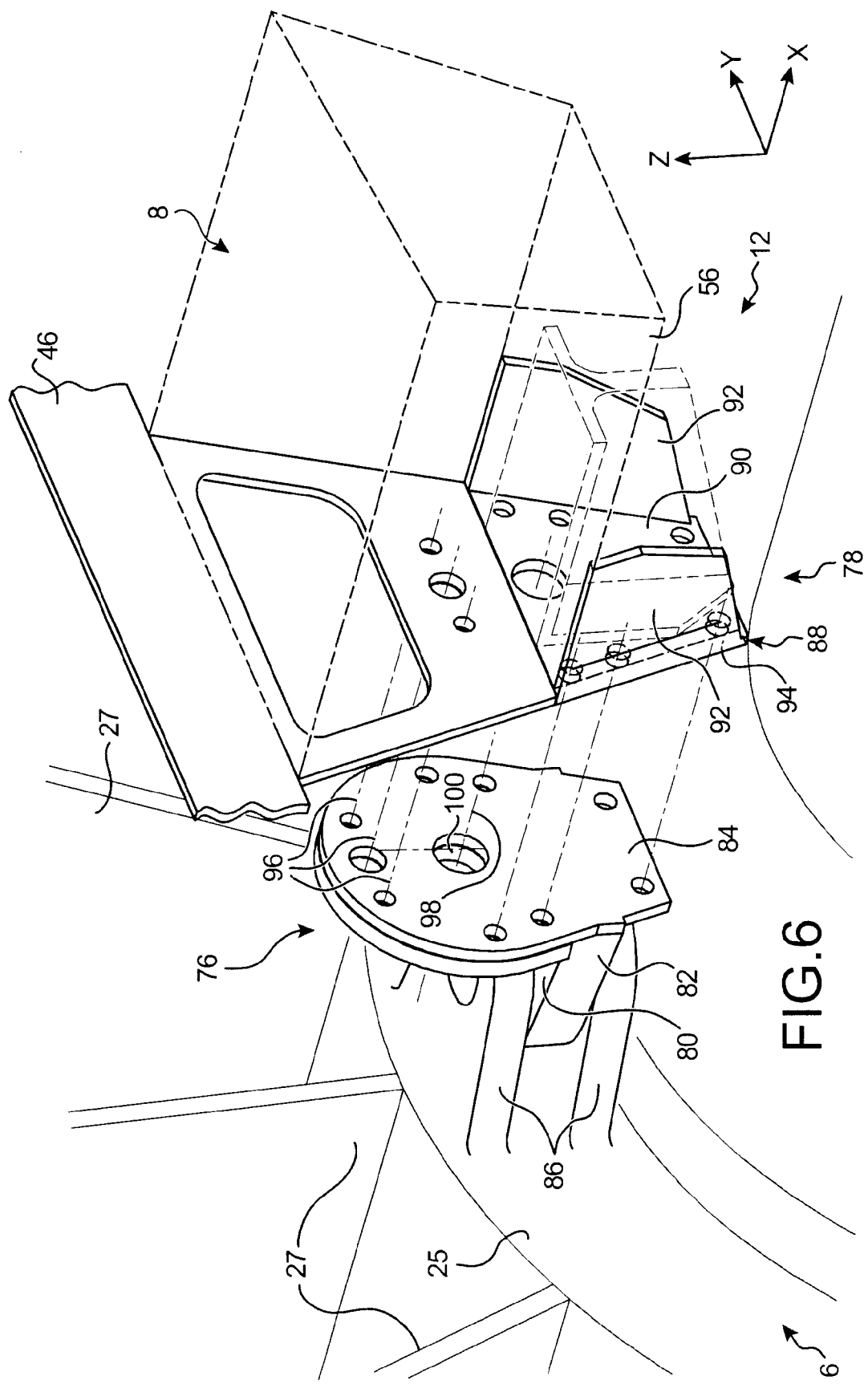
FIG. 6 is an exploded, perspective view of the second attachment shown on the engine assembly in FIG. 5.

In this FIG. 6 showing the second attachment 12, or lower attachment, before final mounting between the engine 6 and the rigid structure 8, it can be seen that this attachment 12 comprises an engine part 76 fixed to the engine 6 and an engine mount part 78 fixed to the rigid structure 8, each of these parts 76, 78 offering the vertical plane passing through the longitudinal centreline 5 as plane of symmetry.

The engine part 76 comprises an upper central bracket 80 and a lower central bracket 82, these brackets 80, 82 being in contact and respectively having an L-shaped section and a general T-shaped section. They are arranged so that their superimposed aft parts are oriented along a plane YZ, and so that the aft part of bracket 82 positioned the most aft forms a contact surface 84 oriented along a plane YZ, and towards the aft.

The forward contacting parts of these two central brackets 80, 82 are inserted between two support brackets 86 secured to an upper part of portion 25, these two brackets 86 being arranged along planes XY, in the same manner as the above-indicated forward parts. By way of indication, the junction between the support brackets 86 and the forward parts of brackets 80, 82 is preferably obtained using a pin e.g. a double pin passing through all these elements in direction Z.

Regarding the engine mount part 78, this is equipped with a central bracket 88 provided with a central plate 90 oriented along a plane YZ, and with two side walls 92 each oriented along a plane XZ.

This central bracket 88, via its plate 90, defines a contact surface 94 oriented along a plane YZ and forwardly.

Additionally, it is noted that this bracket 88 is positioned globally below a forward end of the rigid structure 8 to which it is secured, but the central plate 90 can nevertheless extend upwardly until it integrates the central plate 46 of the forward attachment 10, particularly illustrated FIG. 3. On the other hand, the side walls 92 of this bracket 88 are preferably positioned in the continuity of the side walls (not referenced) of the rigid structure 8, as is clearly visible FIG. 6.

Also, one or more longitudinal reinforcement ribs (only one being shown as a dotted line) can be added parallel to the side walls 92, to increase the possibilities of thrust load transfer.

As is schematically illustrated by the dotted lines 96, 98 in FIG. 6, the engine and engine mount parts 76, 78 are intended to be fixed to each other e.g. via bolts and a pin (not shown) oriented along direction X. For this purpose, the contact surfaces 84, 94 are previously brought to bear against each other, then the bolts and pin are positioned so that they successively pass through one of the central brackets, 80, 82 and the central plate 90 provided with holes for this purpose.

By way of indication, it is specified that the hole referenced 100 in FIG. 6 and made in the upper central bracket 80 is intended to receive a pin oriented longitudinally so that it is able to transfer the loads exerted along direction Y since, as previously indicated, it is recalled that this second attachment 12 is intended to transfer the loads exerted along directions X and Y.

This second alternative has the advantage of simplifying the forward part of the rigid structure 8 which no longer needs to integrate any projecting part as is the case with the first alternative shown FIG. 2. The rigid structure is then in the form of a conventional box 56 identical or similar to the one shown FIG. 2.

Additionally the two attachments 10, 12 forming the mounting means both have a vertical and transverse interface which advantageously allows axial positioning of the engine 6 on the rigid structure 8, the relative axial movement performed during mounting then being abutted by the abutments between the different surfaces 34, 47, 84, 94 arranged along planes YZ.

Figure 7:
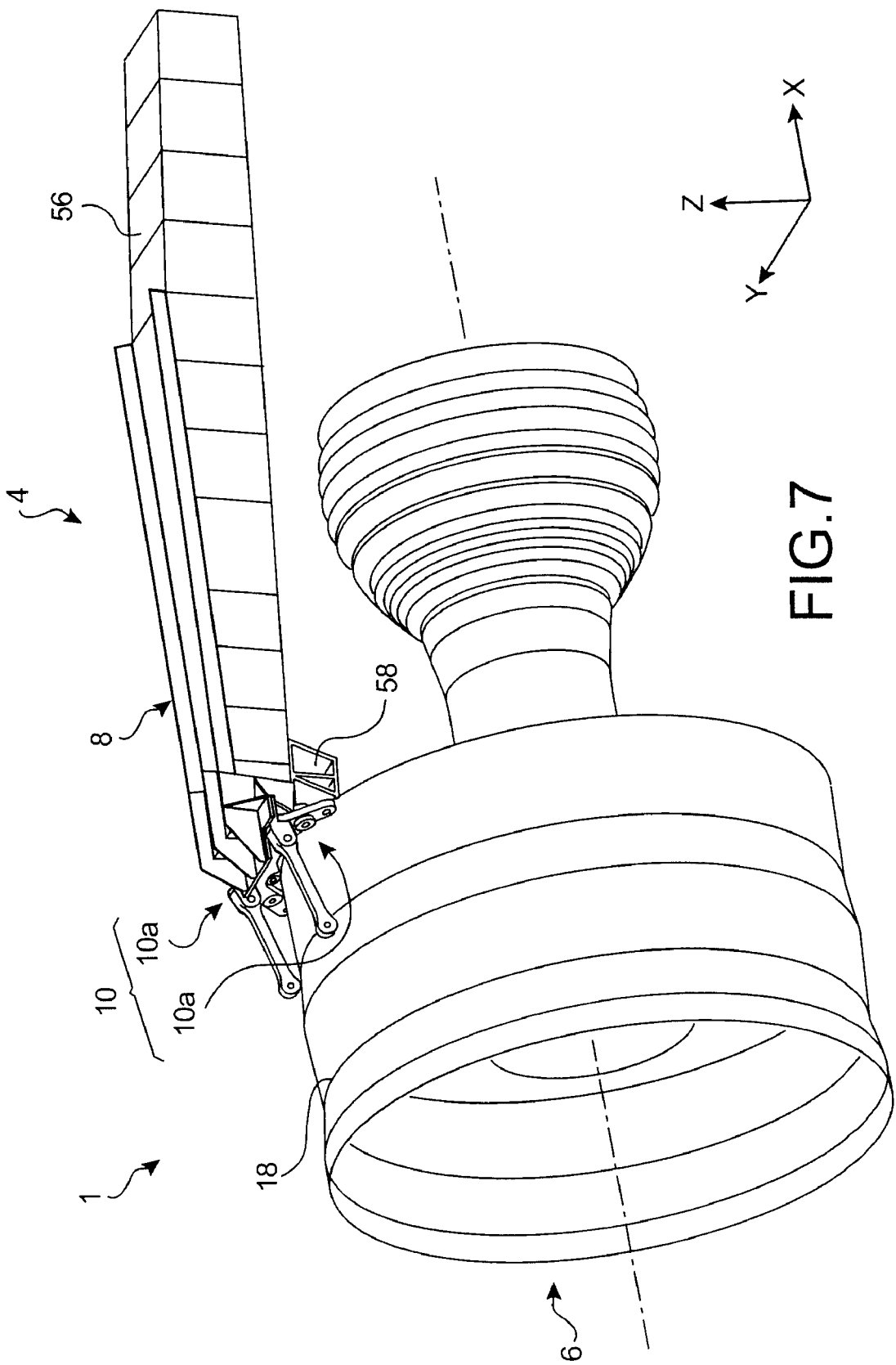
FIG. 7 is a perspective view of an aircraft engine assembly in the form of a third alternative to implement the first preferred embodiment of the present invention.

FIG. 7 shows an engine assembly 1 in the form of a third alternative to implement the first preferred embodiment shown FIG. 1.

In this third alternative, the second attachment (not visible since it is a perspective view) is of identical design to attachment 12 shown FIGS. 2 and 4, or of identical design to attachment 12 shown FIGS. 5 and 6. Therefore, it will not be further described.

On the other hand the first attachment 10 of this third alternative differs from the one described above for the first and second alternatives, whilst remaining of the type with two semi-attachments 10a each able to transfer loads exerted along directions X and Z.

Figure 8:
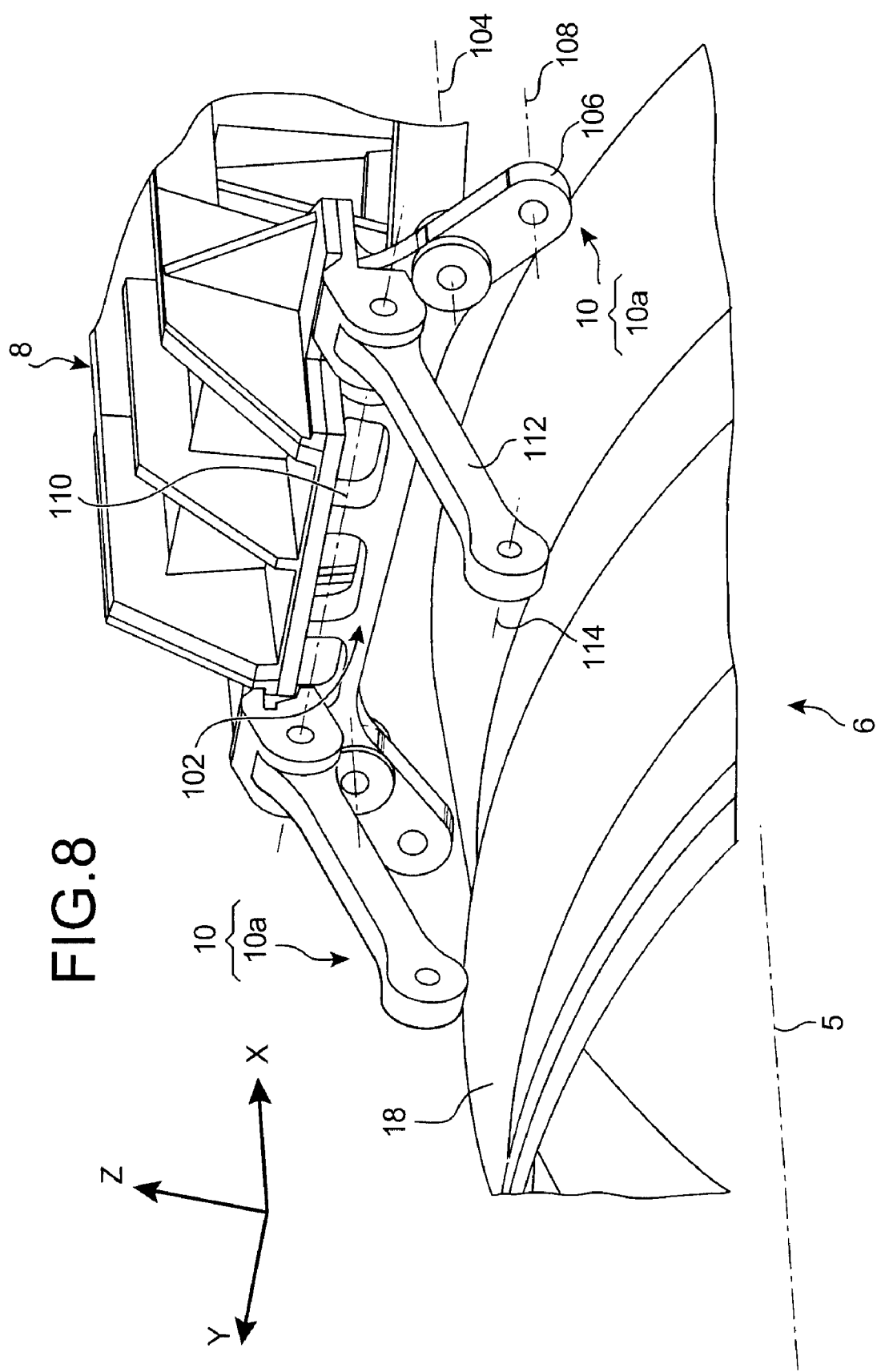
FIG. 8 is a partial perspective view of the first attachment shown on the engine assembly in FIG. 7.

With reference to FIG. 8 showing the first attachment 10, or upper attachment, positioned between the engine 6 and the rigid structure 8, it can be seen that this attachment 10, as plane of symmetry, offers the vertical plane passing through the longitudinal centreline 5, this specificity being provided in particular so as to define the two semi-attachments 10a.

This attachment 10 firstly comprises a central bracket 102 oriented transversally and secured to a forward end part of the rigid structure 8, whose design may be identical or similar to the one described for the second alternative.

The bracket 102 therefore takes part in the defining of the two semi-attachments 10a, since the two side ends of this central bracket 102 respectively belong to the left semi-attachment and the right semi-attachment.

First, it is specified that since the two semi-attachments 10a are identical, only the one on the left is described below.

Therefore, as can be seen FIG. 8, the side end of the central bracket 102 carries a shackle 106 pivoted thereupon along a longitudinal axis 104 and which lies in a plane YZ, this shackle 106 lying at an angle so that it extends upwardly towards the vertical plane passing through the centreline 5 of the engine 6. The outer end of the shackle 106 is pivoted along a longitudinal axis 108 on a bracket (not shown) secured to an upper part of the fan case 18. Therefore the specific positioning and securing of the shackle 106 allow the semi-attachment 10a concerned to transfer the loads exerted along direction Z.

Additionally the side end of the central bracket 102 also carries a link 112 pivoted along a transverse axis 110, this link 112 lying in a plane XZ and slightly at an angle so that it extends slightly upwards towards the aft of the engine 6. The forward end of the link 112 is pivoted along a transverse axis 114 on a bracket (not shown) secured to an upper part of the fan case 18. Therefore, the specific positioning and securing of the link 112 allow the semi-attachment 10a concerned to transfer the loads exerted along direction X.

Figure 9:
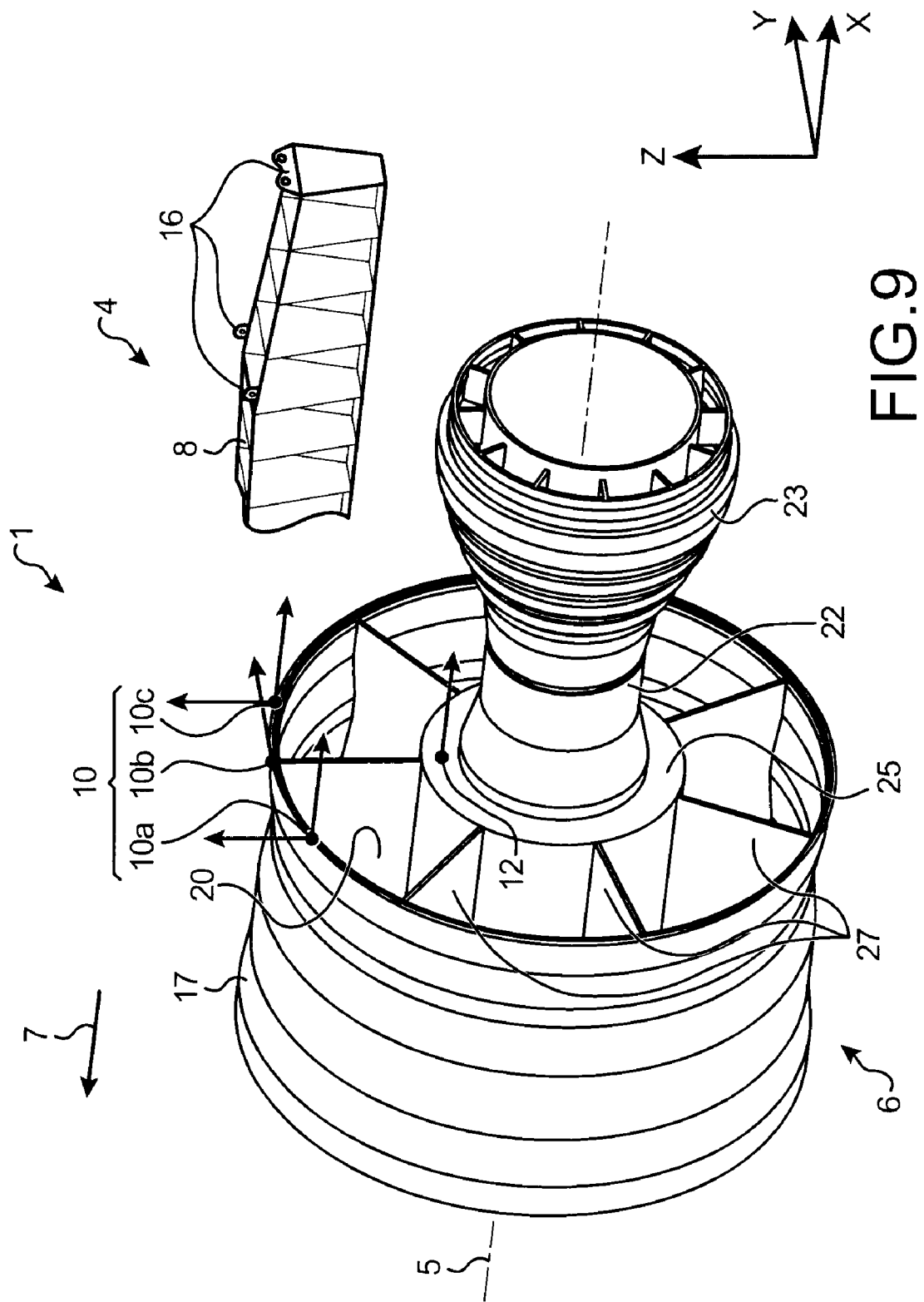
FIG. 9 is a schematic, partial, perspective view of an aircraft engine assembly according to a second preferred embodiment of the present invention.

With reference now to FIG. 9, an aircraft engine assembly 1 can be seen, intended to be suspended below a wing (not shown) of this aircraft, this assembly 1 being in the form of a second preferred embodiment of the present invention comprising a mount device 4 and an engine 6 such as a turbojet engine attached below this mount device 4.

This engine assembly 1 is substantially identical to the one shown FIG. 1, the only difference being that the loads exerted along direction Y are no longer transferred by the second engine attachment 12, but by a central part 10b of the first engine attachment 10, which comes in addition to the two semi-attachments 10a already present.

As a result, with said isostatic arrangement, as is schematically illustrated FIG. 9, the loads exerted along the longitudinal direction X are jointly transferred by the first and second attachments 10, 12, the loads exerted along the transverse direction Y are transferred solely by the central part 10b of engine attachment 10, and the loads exerted along the vertical direction Z are jointly transferred by the two semi-attachments 10a of the first attachment 10.

Also, transfer of the moment exerted along direction X is ensured solely by the two semi-attachments 10a of attachment 10, while transfer of the moments exerted along direction Y is ensured jointly by these two engine attachments 10, 12. Additionally, transfer of the moment exerted along direction Z is also ensured solely by the two semi-attachments 10a of the first attachment 10.

Figure 10:
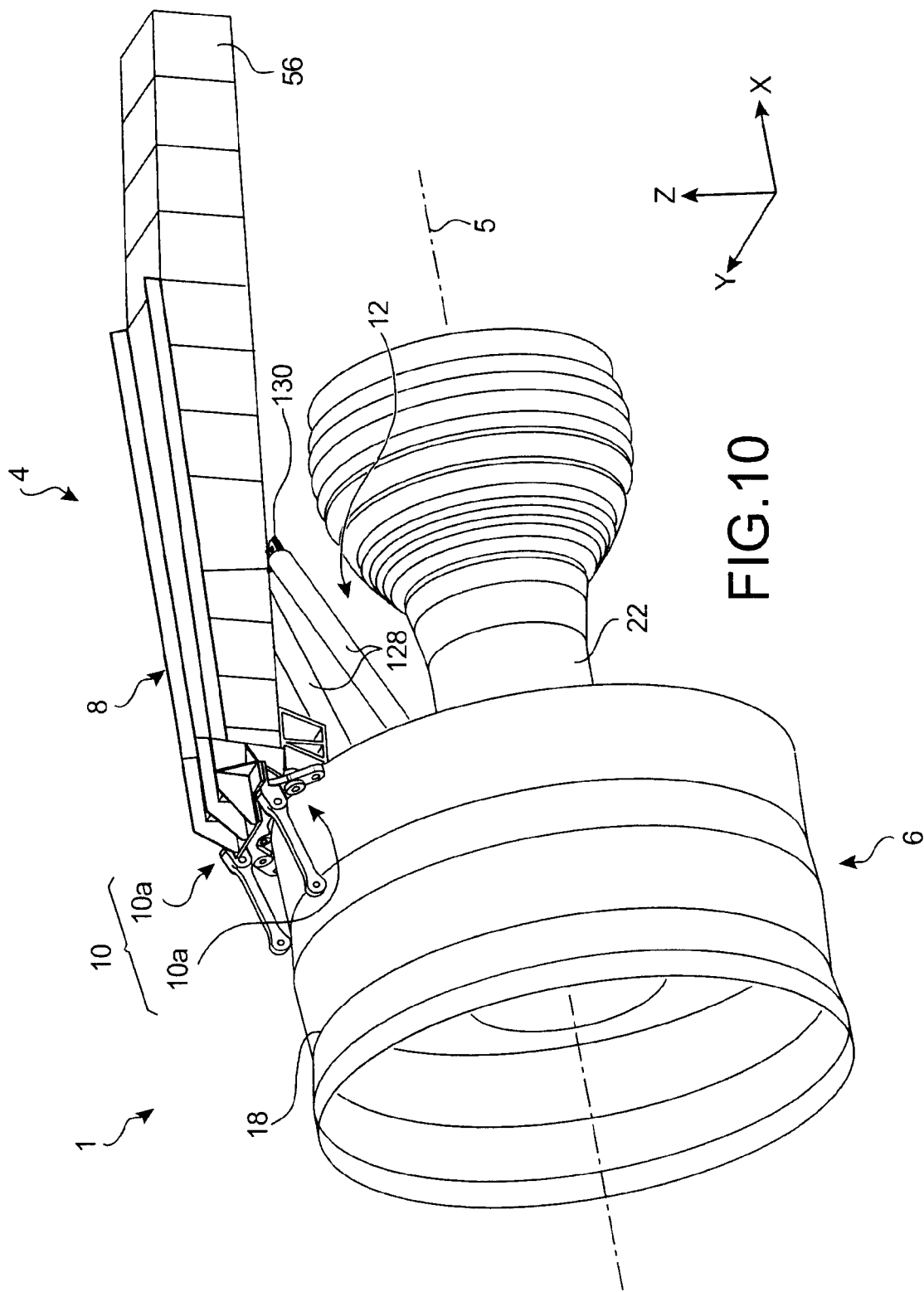
FIG. 10 is a perspective view of an aircraft engine assembly in the form of a first alternative to implement the second preferred embodiment of the present invention.

FIG. 10 shows an engine assembly 1 in the form of a first alternative to implement the second preferred embodiment shown FIG. 9.

In this first alternative, the first attachment 10 which incorporates the two semi-attachments 10a is of similar design to that of attachment 10 shown FIG. 8. Therefore, only additional elements will be described below with reference to FIG. 11.

In addition to two semi-attachments 10a each transferring the loads exerted along directions X and Z, the forward attachment 10 effectively incorporates a central part 10b in the form of a shackle 120 lying in a plane YZ and pivoted along a longitudinal axis 122 on the central bracket 102, this shackle 120 being arranged between the two shackles 106 of the two semi-attachments 10a.

Figure 11:
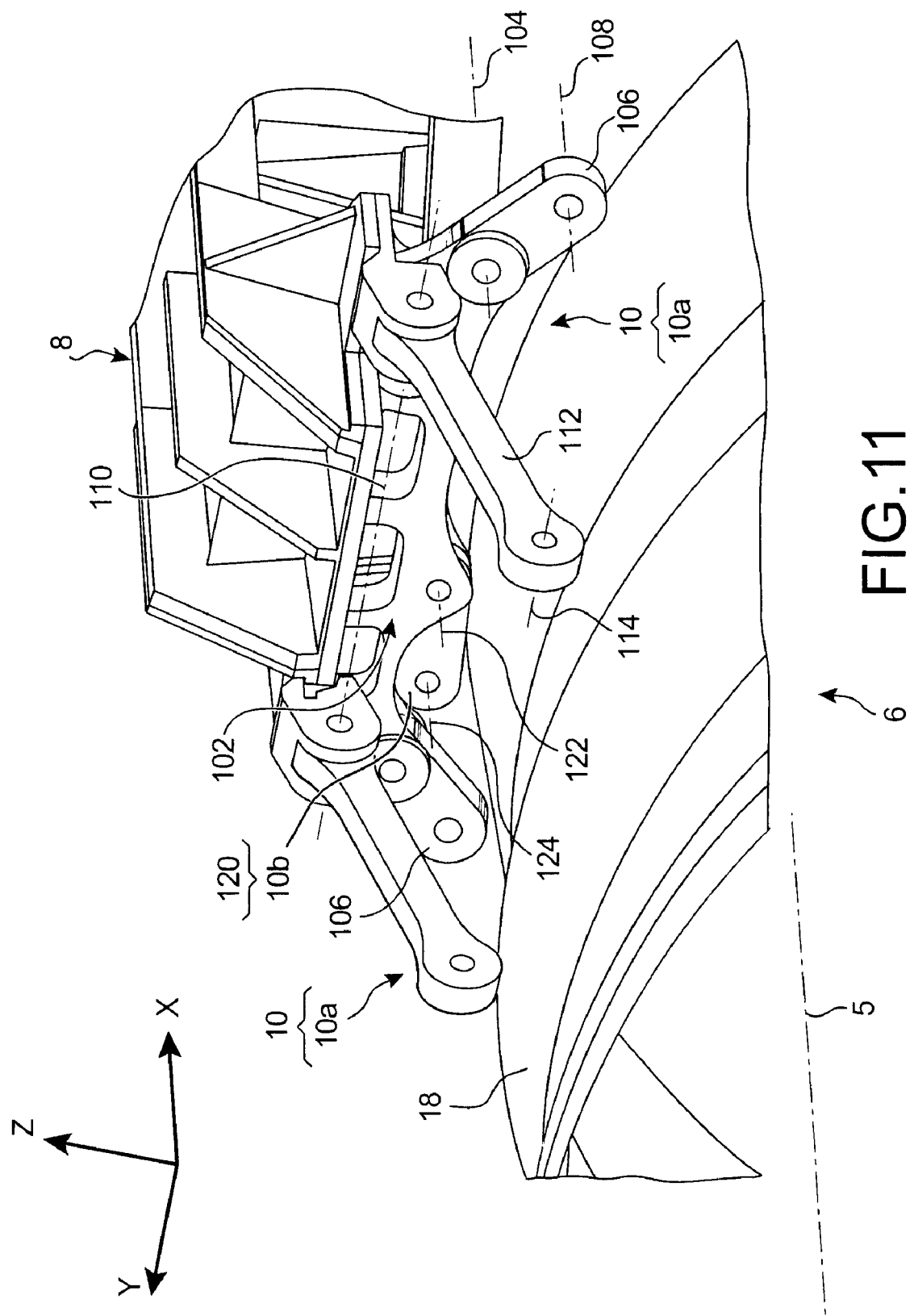
FIG. 11 is an exploded, perspective view of the first attachment shown on the engine assembly in FIG. 10.

Therefore, as can be seen FIG. 11, a central part of the bracket 102 carries shackle 120 pivot fashion, this shackle being oriented substantially along direction Y of the engine 6, so as to transfer the loads exerted along this same direction. Finally, the other end of the shackle 120 is pivoted along a longitudinal axis 124 on a bracket (not shown) secured to an upper part of the fan case 18.

Again with reference to FIG. 10, it is noted that the second attachment 12 of this first alternative has the specificity of being in the form of a conventional thrust mount device with side links, also secured to the forward part of the central case 22, e.g. to the portion (not visible) carrying the fixed blades connecting this same central case 22 to the fan case 18.

Effectively, the second attachment 12 in this first alternative comprises two side thrust links 128 arranged either side of the vertical plane passing through the longitudinal centreline 5 of the engine 6. Each link 128 therefore comprises a forward end pivoted on a bracket (not visible) secured to the forward part of the central case 22, and an aft end pivoted on an evener bar 130 of the type known to those skilled in the art and therefore forming an integral part of attachment 12.

This evener bar 130 is secured to a lower part of the rigid structure 8, e.g. directly above an aft part of the central case 22, or directly above the exhaust case 23.

This first alternative has the advantage of simplifying the forward part of the rigid structure 8 which only needs to carry attachment 10, and no longer carries attachment 12. This rigid structure 8 can then be in the form of simple conventional box known to persons skilled in the art.

Figure 12:
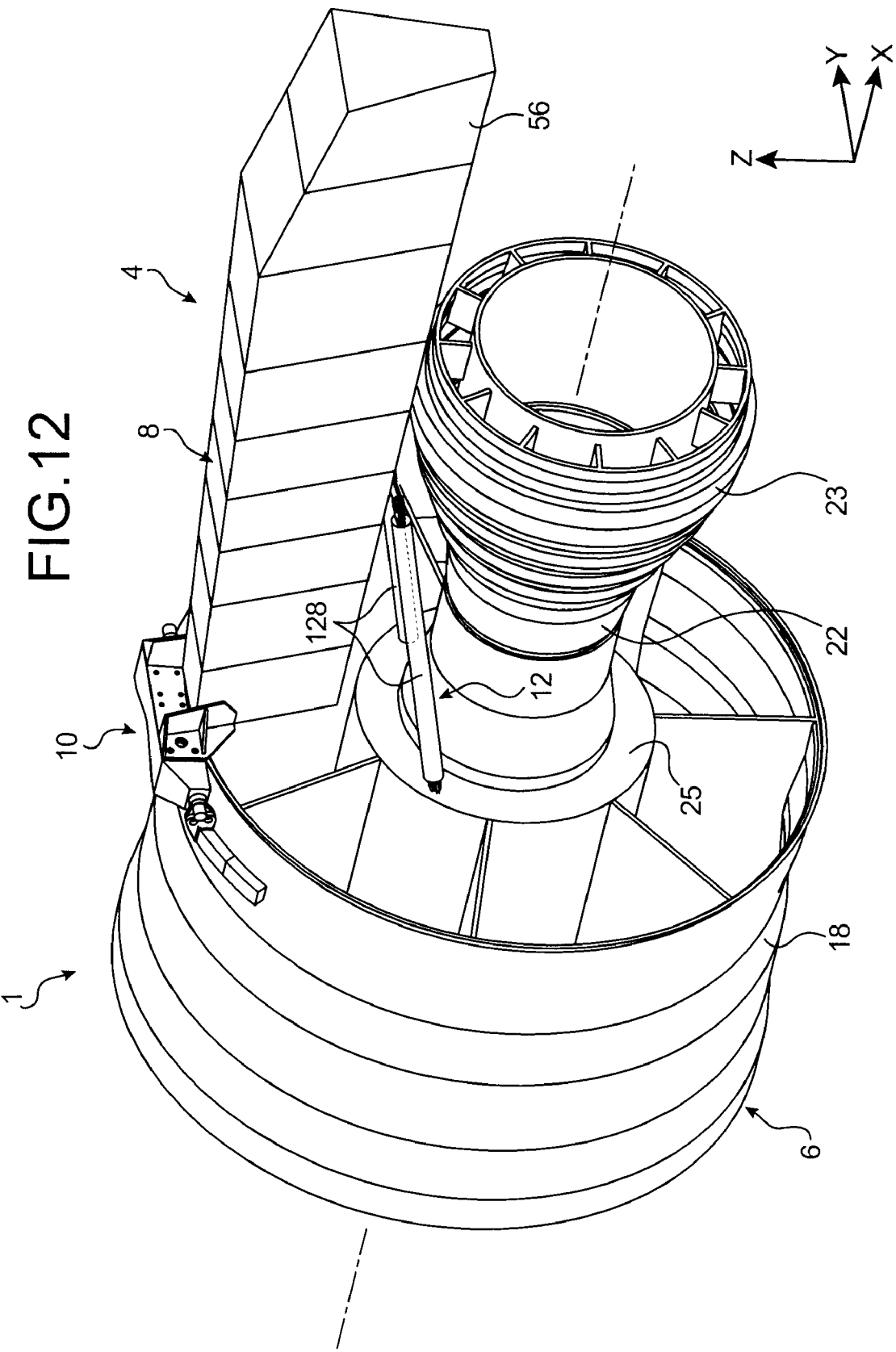
FIG. 12 is a perspective view of an aircraft engine assembly in the form of a second alternative to implement the second preferred embodiment of the present invention.

FIG. 12 shows an engine assembly 1 in the form of a second alternative to implement the second preferred embodiment shown FIG. 9.

In this second alternative, the first attachment 10 is of identical design to that of attachment 10 shown FIG. 3, with the additional particular aspect that it is provided to ensure the transfer of loads exerted along direction Y. Therefore, this first attachment 10 will not be further described.

Also, the second attachment 12 is of identical design to that of attachment 12 shown FIG. 10, in the sense that it is in the form of a conventional thrust mount device with two side links 128. Therefore, this second attachment 12 will also not be further described.

Finally, it is noted that the two first alternatives of the first preferred embodiment respectively illustrated FIGS. 2 and 5 are designed so that they are able to ensure the transfer of loads exerted along direction Y by means of the first attachment 10, and solely to ensure the transfer of loads exerted in direction X by means of the second attachment 12, so that these two alternatives are also suitable to implement the second preferred embodiment of the present invention. In particular, in the case of the second alternative shown FIGS. 5 and 6, the attachment 12 no longer needs to integrate any longitudinal pin passing through a hole 100, since the transfer of loads exerted along direction Y in this case is achieved by means of attachment 10, whose design which was detailed with reference to FIG. 3 is fully capable of ensuring such transfer.

Evidently, various modifications may be made by those skilled in the art to the aircraft engine assemblies 1 just described solely as non-limiting examples.

The invention claimed is:

1. An aircraft engine assembly, comprising:
   an engine; and
   a mount device for the engine, the engine mount device configured to be positioned between a wing of the aircraft and the engine, and comprising a rigid structure and means to mount the engine on the rigid structure, the rigid structure being fixed to the wing, the means to mount consisting of a first attachment and a second attachment,
   wherein the first attachment includes two side semi-attachments each fixed to a fan case of the engine, and the second attachment is fixed to a forward part of a central case of the engine, and
   wherein the first attachment is projecting above the rigid structure and the fan case and the second attachment is disposed below the rigid structure.

2. An engine assembly according to claim 1, wherein the second engine attachment is configured to transfer loads exerted along a longitudinal direction of the engine, and wherein the two semi-attachments of the first engine attachment are each configured to transfer the loads exerted along the longitudinal direction of the engine and along a vertical direction of the engine.

3. An engine assembly according to claim 2, wherein the second engine attachment is further configured to transfer loads exerted along a transverse direction of the engine.

4. An engine assembly according to claim 1, wherein the forward part of the central case carries fixed blades connecting the central case to the fan case.

5. An engine assembly according to claim 1, wherein the first attachment comprises an engine part secured to the engine and an engine mount part secured to the rigid structure, the engine part and engine mount part being fixed to one another and respectively having two contact surfaces bearing on each other, the two contact surfaces being oriented along a plane defined by the transverse and vertical directions of the engine.

6. An engine assembly according to claim 5, wherein the second attachment comprises an engine part secured to the engine and an engine mount part secured to the rigid structure, the engine part and engine mount part being fixed to one another and respectively having contact surfaces bearing against each other, the contact surfaces being oriented along a plane defined by the longitudinal and transverse directions of the engine.

7. An engine assembly according to claim 6, wherein the two contact surfaces are flat.

8. An engine assembly according to claim 5, wherein the two contact surfaces are flat.

9. An engine assembly according to claim 5, wherein the second attachment comprises an engine part secured to the engine and an engine mount part secured to the rigid structure, the engine and engine mount parts being fixed to one another and respectively having two contact surfaces bearing against each other, the two contact surfaces being oriented along a plane defined by the transverse and vertical directions of the engine.

10. An engine assembly according to claim 9, wherein the second attachment comprises two side thrust links, the links having an aft end joined to the rigid structure.

11. An engine assembly according to claim 1, wherein the means to mount forms an isostatic system.

12. An engine assembly according to claim 1, wherein the second attachment has a plate shape.

13. An engine assembly according to claim 1, wherein the first attachment is substantially disposed above the rigid structure.

* * * * *